(12) United States Patent  
Haussmann et al.

(10) Patent No.: US 8,988,527 B2
(45) Date of Patent: Mar. 24, 2015

(54) METHOD AND APPARATUS FOR MONITORING A THREE-DIMENSIONAL SPATIAL AREA

(75) Inventors: Joerg Haussmann, Ostfildern (DE); Soeren Hader, Esslingen (DE)

(73) Assignee: Pilz GmbH & Co KG., Ostfildern (DE)

( * ) Notice: Subject to any disclaimer, the term of this patent is extended or adjusted under 35 U.S.C. 154(b) by 686 days.

(21) Appl. No.: 12/468,919

(22) Filed: May 20, 2009

(65) Prior Publication Data

US 2009/0268029 A1    Oct. 29, 2009

Related U.S. Application Data

(63) Continuation of application No. PCT/EP2007/009333, filed on Oct. 27, 2007.

(30) Foreign Application Priority Data

Nov. 24, 2006    (DE) .......................... 10 2006 057 605

(51) Int. Cl.
*H04N 7/18* (2006.01)
*F16P 3/14* (2006.01)

(52) U.S. Cl.
CPC ........................................ *F16P 3/14* (2013.01)
USPC ........... 348/153; 348/143; 348/152; 348/161; 348/148; 382/103; 382/106

(58) Field of Classification Search
USPC ....................................................... 348/153
See application file for complete search history.

(56) References Cited

U.S. PATENT DOCUMENTS

| | | | |
|---|---|---|---|
| 2003/0165268 A1* | 9/2003 | Franz | 382/181 |
| 2005/0089193 A1* | 4/2005 | Kaushal et al. | 382/103 |
| 2005/0207618 A1* | 9/2005 | Wohler et al. | 382/103 |
| 2005/0207619 A1* | 9/2005 | Lohmann | 382/103 |
| 2005/0232465 A1* | 10/2005 | Braune et al. | 382/103 |
| 2006/0152351 A1* | 7/2006 | Daura Luna et al. | 340/435 |
| 2007/0247526 A1* | 10/2007 | Flook et al. | 348/161 |
| 2008/0079810 A1* | 4/2008 | Fitzgibbon | 348/152 |
| 2009/0212946 A1* | 8/2009 | Pikaz | 340/541 |

FOREIGN PATENT DOCUMENTS

| | | |
|---|---|---|
| DE | 100 49 366 A1 | 4/2002 |
| DE | 10 2004 043 515 A1 | 3/2006 |
| DE | 10 2005 063 217 A1 | 7/2007 |
| DE | 10 2006 050 235 A1 | 4/2008 |
| EP | 1 586 805 A1 | 10/2005 |
| WO | WO 02/073086 A1 | 9/2002 |
| WO | WO 2004/029502 A1 | 4/2004 |
| WO | WO 2005/101812 A1 | 10/2005 |

* cited by examiner

*Primary Examiner* — Lynn Feild
*Assistant Examiner* — Natisha Cox
(74) *Attorney, Agent, or Firm* — Harness, Dickey & Pierce, P.L.C.

(57) ABSTRACT

A spatial area is monitored by means of at least a first and a second image recording unit that have a common viewing area. At least one virtual protection zone is defined within the common viewing area. A first and a second image of the spatial area are recorded by means of the first and a second image recording unit. The images are compared with one another in order to identify mutually disjoint image regions in the images. An alarm signal is generated when a disjoint image region covers the virtual protection zone.

14 Claims, 3 Drawing Sheets

METHOD AND APPARATUS FOR MONITORING A THREE-DIMENSIONAL SPATIAL AREA

CROSS REFERENCES TO RELATED APPLICATIONS

This application is a continuation of international patent application PCT/EP2007/009333 filed on Oct. 27, 2007 designating the U.S., which international patent application has been published in German language as WO 2008/061607 A1 and claims priority from German patent application DE 10 2006 057 605.5 filed on Nov. 24, 2006. The entire contents of these prior applications are incorporated herein by reference.

BACKGROUND OF THE INVENTION

The present invention relates to a method and an apparatus for monitoring a three-dimensional spatial area. More particularly, the invention relates to a method and an apparatus designed for safeguarding an automatically operating installation which poses a risk to persons or other objects. By way of example, the automatically operating installation can be a robot whose movements constitute a risk for persons or objects that are present in the working envelope of the robot. The classical approach is to protect such automatically operating installations by means of mechanical blocking means such as protective fences, protective doors and the like, and by means of light barriers and/or laser scanners. The working envelope of the installation is blocked such that the intrusion of a person or another foreign object is prevented or at least detected. In the last case, detection leads to a shutdown of the installation and/or to another safety reaction.

Light barriers, laser scanners and protective fences, however, can block an automatically operating installation only over a relatively large space and with rigid, largely rectilinear boundary surfaces. Such blocking thus requires a relatively large space and is inflexible and complicated to install. Moreover, such blocking means can substantially impair the operability of the installation, and this frequently leads to manipulations and risks of accidents resulting therefrom.

For this reason, there have been efforts for some time to safeguard dangerous working envelopes of automatically operating installations by means of camera-based monitoring apparatuses. WO 2004/029502 A1 discloses such an apparatus. The known apparatus has three image recording units of which each two image recording units form a pair. Recorded image pairs are evaluated by means of two algorithmically different methods in order to obtain three-dimensional image data of the monitored spatial area. These image data can be used to monitor virtual protection zones around the monitored installation. The known apparatus, however, is not yet optimal, because it requires a relatively large minimum distance between the image recording units and the monitored spatial area.

DE 100 49 366 A1 discloses another method and apparatus for monitoring a spatial area by means of at least a first and a second image recording unit whose viewing areas are oriented in at least partially overlapping fashion. A virtual protection zone is monitored within the common viewing area. The use of at least two image recording units serves the purpose here of detecting disturbing factors in the near zone such as, for example, an insect that runs over the lens of one of the image recording units, in order to avoid a false alarm being triggered for that reason. Consequently, the apparatus of DE 100 49 366 A1 triggers an alarm signal only when a foreign object is simultaneously detected and classified as being relevant to an alarm by both image recording units. In addition, a three-dimensional evaluation of the recorded images is envisaged in order to further reduce disturbing influences in the case of the detection of alarm-relevant objects, for example by detecting only objects in a defined distance range. However, the known method and apparatus are not suitable for safeguarding the working envelope of an automatically operating installation with a sufficient error tolerance.

SUMMARY OF THE INVENTION

Against this background, it is an object of the present invention to provide a method and an apparatus for monitoring a spatial area with an increased safety such that it becomes possible to automatically safeguard a dangerous area such as, for example, the working envelope of an automatically operating installation. In particular, it is an object to provide such a method and such an apparatus wherein the safety function is not endangered by foreign objects in the near zone.

In accordance with one aspect of the invention, there is provided a method for monitoring a three-dimensional spatial area for safeguarding an automatically operating installation, the method comprising the steps of providing a first image recording unit having a first viewing area and providing a second image recording unit having a second viewing area, the first and second viewing areas both being directed to the spatial area in a partially overlapping manner so as to form a common viewing area, defining at least one virtual protection zone within the common viewing area, recording a first image of the spatial area by means of the first image recording unit, and recording a second image of the spatial area by means of the second image recording unit, comparing the first and second images in order to identify mutually disjoint image regions in the first and second images, and generating the alarm signal as a function of the disjoint image regions and the virtual protection zone, wherein the alarm signal is generated whenever a disjoint image region covers the virtual protection zone.

According to another aspect, there is provided an apparatus for monitoring a three-dimensional spatial area for protecting an automatically operating installation, the apparatus comprising a first image recording unit having a first viewing area for recording a first image of the spatial area, and comprising a second image recording unit having a second viewing area for recording a second image of the spatial area, the first and second viewing areas both being directed to the spatial area in a partially overlapping manner so as to form a common viewing area, the apparatus further comprising an evaluation unit with a memory for storing a data record that defines at least one virtual protection zone within the common viewing area, with the evaluation unit being designed to compare the first and second images in order to identify mutually disjoint image regions in the first and second images, and with the evaluation unit being designed to trigger an alarm signal as a function of at least one of the images when a disjoint image region covers the virtual protection zone.

Disjoint image regions are regions in the first and second images that do not exhibit adequate correlations despite the common (overlapping) viewing area. Adequate correlations result whenever the at least two image recording units record and detect identical objects because of their common viewing area. The position and shape of these objects can vary in the at least two images, since the viewing areas are not identical, although they overlap. Slightly different viewing angles might result. Nevertheless, a correlation can be found between the corresponding image regions in the at least two images by means of image evaluation methods such as are described, for example, in WO 2004/029502 A, which is incorporated by reference herewith. In other words, identical objects in the at least two images can be identified and assigned to one another despite the slightly different viewing angles. However, if an image contains one or more image regions for which no correlation can be found in the respective other image, it is to be assumed that the corresponding image region shows an object that is not present in the respective other image, or at least it cannot be detected. Such an image region is denoted as a disjoint image region in the context of the present invention.

In the novel method and apparatus, a disjoint image region in one of the images does not trigger an alarm signal per se. There is an additional check as to whether the disjoint image region covers the virtual protection zone that lies within the common viewing area of the two image recording units and that is monitored by means of the novel method and the novel apparatus. A disjoint image region in one or both images therefore does not trigger an alarm signal when it does not impair the view of the corresponding image recording unit onto the defined protection zone. Conversely, however, the alarm signal is immediately generated when the disjoint image region covers the virtual protection zone. Preferably, the alarm signal is also generated when a disjoint image region partially covers the virtual protection zone, with preferred exemplary embodiments of the invention comprising image processing steps which result in an implementation where a disjoint image region triggers an alarm signal only when it covers a defined number of pixels in the images, so that covering only one pixel is not enough to cause a generation of the alarm signal.

The novel method and apparatus provide increased safety, because it is ensured that the virtual protection zone is monitored "without gaps", even when, for example, a speck of dirt, an insect or another foreign object impairs the viewing area of an image recording unit in the near zone. However, the novel method and the novel apparatus not only offer monitoring of the near zone, but also ensure that each image recording unit is given a free view onto the protection zone. In particular, it is detected whether a foreign object impairs the view onto the virtual protection zone to the extent that another foreign object could intrude into the protection zone in its "shadow".

As soon as the free view onto the virtual protection zone is restricted for one of the image recording units, the alarm signal is generated by means of which a monitored installation can then be shut down or otherwise put into a state posing no risk. On the other hand, unnecessary erroneous shutdowns are avoided, because not every disjoint image region, and thus not every foreign object, that is recorded only by an image recording unit leads to a safety shutdown.

The novel method and apparatus also provide an improved reliability of detection, because the near zone of the image recording units is monitored in a failsafe manner. Preferably, the novel method and apparatus are based on the method and apparatus disclosed by WO 2004/029502 A1 mentioned above, which means that at least two algorithmically different methods for scene analysis are used. The alarm signal is generated when at least one of these methods yields a detection of a foreign object in or in front of the protection zone.

In a preferred refinement of the invention, at least a first distance value is determined, which distance value is representative of the spatial position of at least one foreign object in the common viewing area, and the alarm signal is further generated as a function of the first distance value.

In this refinement of the invention, a three-dimensional image evaluation takes place in order to determine the exact attitude and position of objects in the common viewing area. Such three-dimensional image information permits protection zones to be defined and monitored more flexibly and in a fashion better adapted to situations. Preferably, an image evaluation based on contour and on correlation, as is described in WO 2004/029502 A1, is used.

In a further refinement, the first distance value is determined by means of a propagation time measuring method.

In the case of a propagation time measuring method, the propagation time of a signal, such as a light signal, to a foreign object and back is measured. The distance from the foreign object can be determined from the known propagation rate of the signal. Propagation time measuring methods are a very cost-effective possibility for obtaining distance information and enabling a three-dimensional image evaluation.

In a further refinement, the first distance value is determined by means of a stereoscopic comparison between the first and second images.

Stereoscopic methods for determining distance information resemble the functioning of the human eye in that they determine the distance to an object by means of the so-called disparity that results in the at least two images because of the slightly different viewing angles. It goes without saying that this refinement also includes trinocular methods and apparatuses, i.e. this refinement is not limited to the use of exactly two image recording units or the recording of exactly two images. The three-dimensional monitoring of a spatial area by means of a stereoscopic method is particularly well suited to the preferred application, because redundant installations are advantageous in terms of the single error tolerance. A stereoscopic installation can make optimum use of the multiply present image recording units. Moreover, the present invention is particularly advantageous for stereoscopic installations, because the determination of the first distance value requires correlating image regions in the first and second images. Disjoint image regions therefore pose a risk to the determination of the first distance value. On the other hand, the novel method and the novel apparatus can easily be integrated in a stereoscopically operating installation with large synergy effects. As already mentioned above, redundant use is advantageously made of a contour-based and a correlation-based image evaluation as stereoscopic methods.

In a further refinement of the invention, the virtual protection zone is defined by means of at least a second distance value, the alarm signal being generated when the second distance value is greater than the first distance value.

This refinement enables a very rapid evaluation with reference to whether a foreign object has intruded into the virtual protection zone. Consequently, this refinement facilitates an evaluation in real time, and this is greatly advantageous for the preferred aim of application. Moreover, this refinement further contributes to monitoring the virtual protection zone without any gaps, because a foreign object that, although being outside the virtual protection zone nevertheless covers the view of the image recording units onto the virtual protection zone, automatically leads to the generation of the alarm signal. It goes without saying that the comparison of the first and second distance values with reference to respectively identical image regions (pixels or pixel clusters) takes place in each image, because only then does a comparison of the distance values supply a meaningful result.

In a further refinement, the disjoint image region is assigned a third distance value that is smaller than the second distance value.

This refinement enables a very simple and efficient implementation of the novel method and apparatus, since the evaluation of the disjoint image region is performed using the same principle as the monitoring of the virtual protection zone.

In a further refinement, the first and the second images are recorded with a higher first resolution, and the comparison for identifying disjoint image regions is performed by means of modified first and second images that have a lower second resolution.

The first and the second images are demagnified in this refinement by reducing their resolution. However, the image section viewed remains the same. This refinement enables a particularly fast implementation of the evaluation, and this further simplifies a real time evaluation. Moreover, this refinement has the advantage that negligible disjoint image regions are suppressed such that the alarm signal is generated only whenever the disjoint image region exceeds a certain minimum size. The risk of false alarms is thereby reduced. The reduction of the resolution can be performed, for example, by replacing defined, coherent pixel regions including a plurality of pixels by a single, averaged pixel value.

In a further refinement, the first and second images are compared at least approximately over the entire surface in order to identify disjoint image regions.

As an alternative to this, it would be conceivable to examine only sections from the first and second images for disjoint image regions. According to the present refinement, however, the first and the second images are searched for disjoint image regions in virtually all subregions, even when this is performed at a reduced resolution in accordance with the preceding refinement. The present refinement provides an even higher reliability of detection compared to a search for disjoint image regions within local subregions only. In preferred refinements, more than 80% of the image content (of reduced resolution) is searched in each image for disjoint image regions, preferably even more than 90%.

In a further refinement, a third image recording unit is provided in order to record a third image of the spatial area, with the first, second and third image recording units being arranged along two nonparallel straight lines, and having viewing areas that lie largely parallel to one another.

In this refinement, the at least three image recording units define a plane, with each two of the at least three image recording units enabling a stereoscopic image evaluation. The use of at least three image recording units is advantageous in order to determine distance values relating to any desired object contours within the monitored spatial area. Moreover, a further redundancy is inherent in such a installation, and this is advantageous for the preferred application for the purpose of safeguarding automatically operating installations.

In particularly preferred refinements, the image evaluation and, in particular, the search for disjoint image regions, are performed in a trinocular fashion, i.e. all three images are compared with one another in each case. The reliability of detection is even further improved in this way.

It goes without saying that the abovementioned features and the following features yet to be explained can be used not only in the respectively specified combination, but also in other combinations or on their own without departing from the scope of the present invention.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
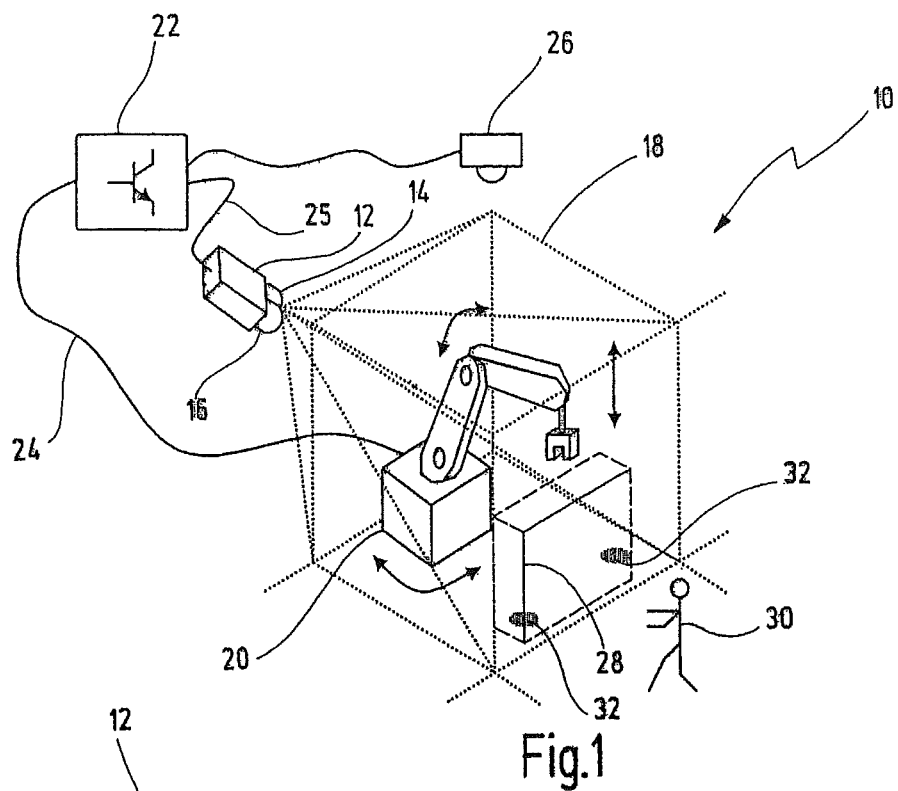
FIG. 1 shows a simplified illustration of a preferred exemplary embodiment of the novel apparatus for protecting an automatically operating installation.

With reference to FIG. 1, reference numeral 10 denotes an exemplary embodiment of the novel apparatus in its entirety.

The apparatus 10 includes a sensor unit 12 that is illustrated here with two separate image recording units 14, 16. In preferred exemplary embodiments, the two image recording units 14, 16 are arranged at a well defined spacing from one another and are aligned parallel to one another, thus enabling a stereoscopic, three-dimensional recording of images. In other exemplary embodiments, the image recording units 14, 16 can merely operate redundantly with respect to one another, without stereoscopic recording of images taking place.

The sensor unit 12 serves to monitor a spatial area 18 comprising an automatically operating installation that poses a risk. In the exemplary embodiment illustrated here, the automatically operating installation is a robot 20 whose working movements are illustrated by means of arrows. Because of the rates of motion and moving masses, the movements of the robot 20 pose a risk to persons or objects in the spatial area 18. However, the novel apparatus and method are by no way limited to the protection of robots. It is also possible to protect dangerous areas of other installations such as, for example, belt conveyors or assembly cells. Basically, the novel apparatus and the novel method can also be used for theft protection, etc.

Reference numeral 22 denotes a control unit that is connected to the robot 20 via a line 24. Via a line 25, the control unit 22 receives an alarm signal or shut-down signal from the sensor unit 12 when a risk situation is detected on the basis of the (preferably three-dimensional) recording of images. The control unit 22 shuts down the robot 20 depending on this alarm signal or shutdown signal. Moreover, the control unit 22 can also control the working movements of the robot 20, as is known per se to the relevant persons skilled in the art. As an alternative, the working movements of the robot 20 can be controlled by a separate, so-called standard controller (not illustrated here). In the preferred exemplary embodiments, the control unit 22 is a failsafe control unit such as, for example, supplied by the applicant of the present invention under the brand name PSS®.

Reference numeral 26 denotes an optional light source which serves for illuminating the spatial area 18.

Illustrated within the spatial area 18 is a virtual protection zone 28 that forms an invisible barrier in order to safeguard the working envelope of the robot 20. When a person 30 or another foreign object enters the protection zone 28, this is detected by means of sensor unit 12, and the sensor unit 12 then generates the alarm signal or shutdown signal 25.

The protection zone 28 is denoted here as a virtual protection zone, since it does not constitute a real obstacle such as, for example, a fence or another mechanical barrier. Instead, the protection zone 28 is produced virtually by means of the sensor unit 12 in that the sensor unit 12 detects the intrusion of the person 30 into that part of the spatial area 18 that corresponds to the protection zone 28.

Reference numerals 32 represent two reference marks that are arranged on the floor of the spatial area 18. The reference marks have a defined pattern. The sensor unit 12 is designed, to carry out functional tests on the basis of the reference marks 32, by which test, for example, it is checked that the sensor unit 12 is monitoring the "correct" spatial area 18. In preferred exemplary embodiments, the functional tests also include a check on impermissibly high levels of contamination, fogging, inter alia, that could jeopardize reliable monitoring of the spatial area 18.

Figure 2:
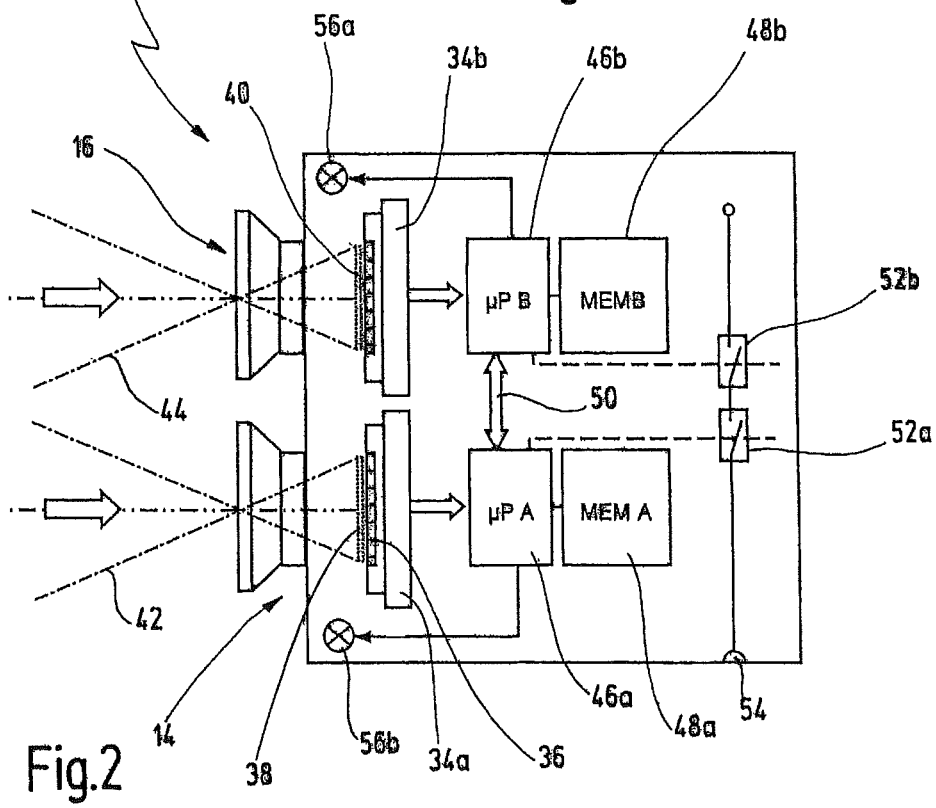
FIG. 2 shows a simplified illustration of a sensor installation having at least two image recording units for the apparatus from FIG. 1.

FIG. 2 shows the sensor unit 12 in further detail. Identical reference numerals denote the same elements as before.

Each image recording unit 14, 16 includes an image sensor 34 with a plurality of pixels 36. The image sensor 34a of the first image recording unit 14 serves to record a first image 38 of the spatial area 18. The image sensor 34b of the second image recording unit 16 records a second image 40 of the spatial area 18. The first and the second images 38, 40 are yielded by the respective viewing area 42, 44 of the two image recording units 14, 16, which are indicated schematically in FIG. 2. In preferred exemplary embodiments, the viewing areas 42, 44 are arranged parallel to one another, i.e. the optical axes of the imaging optics of the image recording units 14, 16 run in parallel. In principle, however, the two image recording units 14, 16 could also be arranged not parallel to one another, for example by carrying out electronic image matching during the subsequent image processing.

In the present exemplary embodiment, each image recording unit 14, 16 has an evaluation unit, these being illustrated here by means of two processors 46a, 46b with assigned memories 48a, 48b. In other preferred exemplary embodiments, the evaluation unit is arranged separately from the two image recording units 14, 16, and this has the advantage that the "eye" of the installation can be implemented in a smaller and lighter fashion and can therefore be mounted more easily above the spatial area 18. The evaluation unit can be more easily cooled in this case and more space is available for components.

On the one hand, programs including program code which is used to carry out image evaluation (preferably stereoscopically) are stored in the memories 48a, 48b. Moreover, a data record (not illustrated here) that is representative of the location and extent of the virtual protection zone 28 is stored in at least one of the memories 48a, 48b. It is also possible to store data records for a plurality of separate or coherent protection zones. In preferred exemplary embodiments, these data records include second distance values which represent distances between the sensor unit 12 and the boundary surfaces of the respective virtual protection zone 28. The processors 46a, 46b initially determine first distance values to objects in the spatial area 18, and use the first distance values and the second distance values from the memory to check whether a foreign object 30 is located within a monitored protection zone 28.

A double arrow 50 in FIG. 2 shows that the processors 46a, 46b can exchange image data and/or evaluation results in order to enable the stereoscopic image evaluation and/or a redundant signal processing. In preferred exemplary embodiments, the evaluation of the first and second images is performed by means of two different three-dimensional scene analysis methods, as described in WO 2004/029502 A1. In other exemplary embodiments, the processors 46a, 46b determine the first distances by means of a propagation time measurement. In these exemplary embodiments, the sensor unit 12 advantageously has one or more light sources 56 that emit a light signal suitable for propagation time measurement. The light sources 56 can be omitted in the case of stereoscopic image evaluation.

The sensor unit 12 is illustrated here with two switching elements 52a, 52b lying redundantly in series with one another. The switching elements 52a, 52b are driven by the processors 46a, 46b in order to generate an alarm signal or shutdown signal at an output 54, which signal can be fed to the master control unit 22 via line 25. Although the switching elements are illustrated here as electromechanical switching elements 52a, 52b, they can also be electronic switching elements, such as MOS transistors.

The functional principle of the apparatus 10 is explained below in a preferred exemplary embodiment by means of FIG. 3. Identical reference numerals continue to denote the same elements as before.

Figure 3:
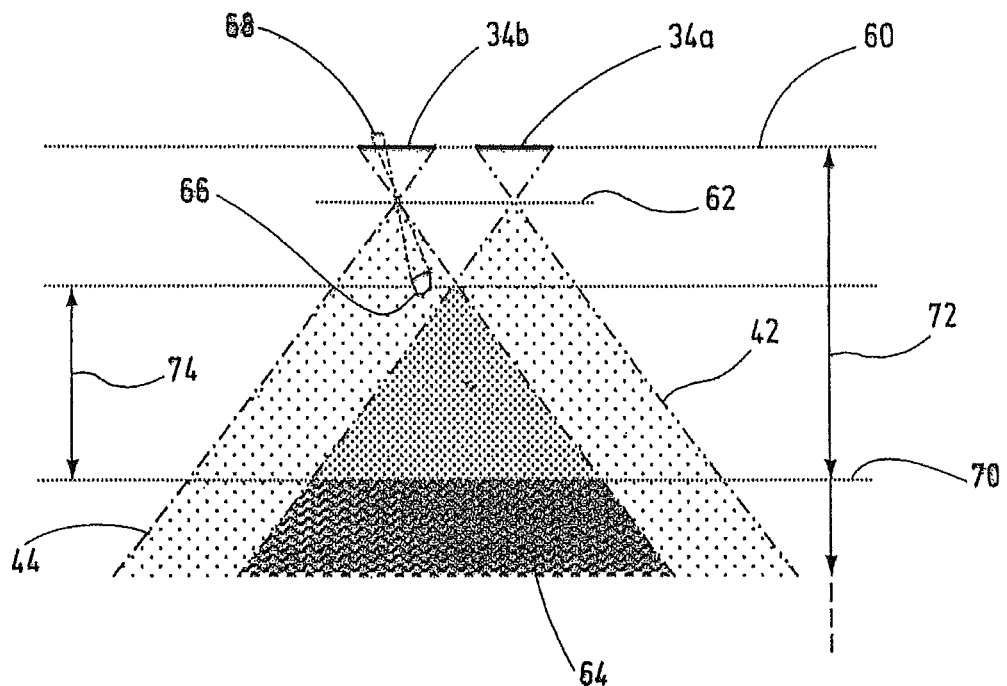
FIG. 3 shows a schematic illustration of the viewing areas of the two image recording units from FIG. 2.

FIG. 3 shows the two image sensors 34a, 34b, which define a sensor plane 60. Reference numeral 62 denotes a plane that is defined by the entrance pupils of the imaging optics of the two image recording units 14, 16. As illustrated in FIG. 3, the viewing areas 42, 44 of the two image recording units 14, 16 open conically in the direction of the spatial area 18, with the respective conical apexes lying in the plane 62 of the entrance pupils. The viewing areas 42, 44 overlap and form a common overlapping viewing area 64. Objects located inside the overlapping viewing area 64 are imaged on both image sensors 34a, 34b. Contrary thereto, an object 66 located outside of the common viewing area 64 is imaged only on that image sensor (here image sensor 34b) in whose viewing area 44 the object is located. The image of object 66 is denoted in FIG. 3 by the reference numeral 68, and is shown here above the sensor plane 60 only for the purpose of better illustration.

Since the object 66 lies here outside the viewing area 42 of the image sensor 34a, the image 68 and a corresponding image region is not contained in image 38. The image 68 therefore contains a disjoint image region that produces no correlation in the case of a comparison of the images 38, 40. The result of this is that no stereoscopic image evaluation is possible in the pixel area that is covered by the image 68 on the image sensor 34b. The sensor unit 12 is therefore not capable of determining distance values in that pixel area which is covered by the image 68. Consequently, the sensor unit 12 can also not monitor a part of the protection zone 28 that is covered by the object 66. As will be explained in even further detail below by means of FIG. 5, the disjoint image region 68 is assigned a third distance value that is selected such that the sensor unit 12 generates the alarm signal or shutdown signal 25 when the disjoint image region 68 covers a part of the protection zone 28.

In preferred exemplary embodiments of the invention, it is not the entire overlapping viewing area 64 that is used as monitoring area. Rather, a "true" monitoring which is dependent on the situation is carried out starting from a defined minimum distance that begins in FIG. 3 at a line 70. The area between line 70 and the sensor plane 60 is denoted as near zone 72. As has previously been explained with respect to object 66, image evaluation and monitoring are performed inside the near zone 72. In other words, an object that is located inside the overlapping viewing area 64, but in its "upper" part 74, is assigned a third distance value, which is dimensioned such that it leads to the generation of the shutdown signal or alarm signal 25 when the virtual protection zone 28 is being covered.

Figure 4:
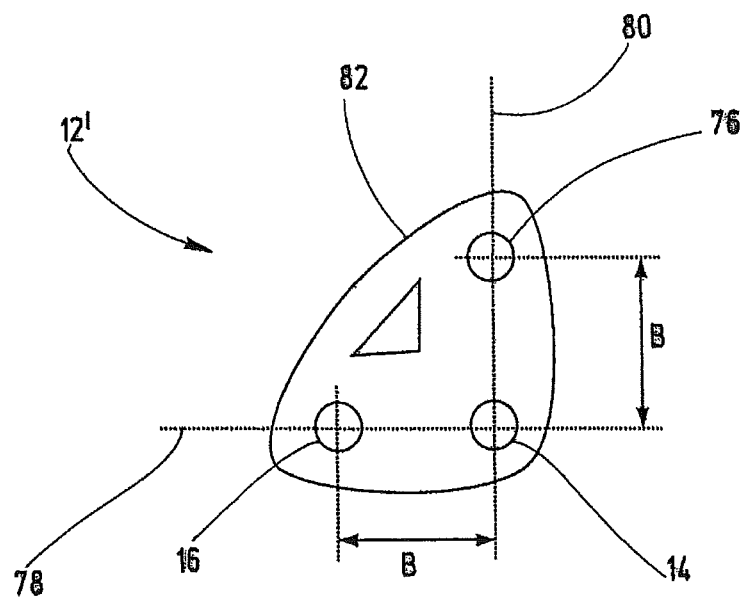
FIG. 4 shows the plan view of a trinocular sensor installation in accordance with a preferred exemplary embodiment of the novel apparatus.

FIG. 4 shows a preferred exemplary embodiment of the sensor unit 12 (denoted here by 12') in a plan view from the front. The sensor unit 12' has three image recording units 14, 16, 76 that are arranged relative to one another in an approximate shape. The image recording units 14, 16 are arranged along a first straight line 78. The image recording units 14, 76 are arranged along a second straight line 80. In the preferred exemplary embodiments, the two straight lines 78, 80 run orthogonally to one another, and the respective pairs 14, 16 and 14, 76 each are spaced apart from one another by a defined base width B. In the preferred exemplary embodiment, the image recording units 14, 16, 76 are arranged on a base plate 82 which is preferably in one piece and torsionally rigid and which permanently fixes the three image recording units 14, 16, 76 in the specified positions. A preferred mechanical design of the sensor unit 12' is described in German Patent Application 10 2006 050 235.3, which is not a prior publication.

Figure 5:
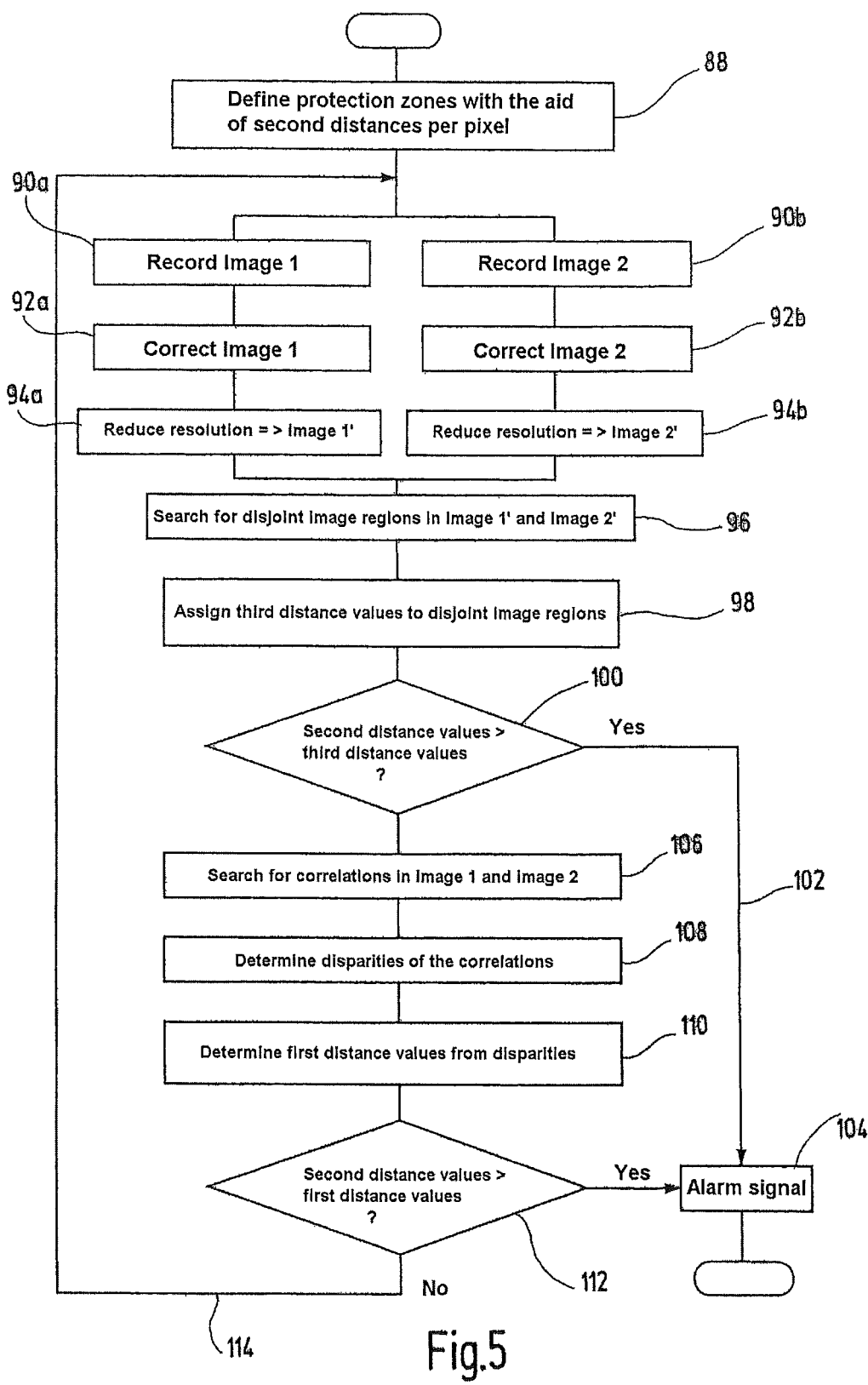
FIG. 5 shows a flowchart for explaining a preferred exemplary embodiment for the novel method.

FIG. 5 shows a flowchart for explaining a preferred exemplary embodiment of the novel method. In accordance with step 88, the virtual protection zone(s) 28 is/are firstly defined. In preferred exemplary embodiments of the method, this is performed by means of a graphic configuration tool as described in German Patent Application 10 2005 063 217.3. According to this method, the operator can draw in graphically virtual protection zones 28 inside a true image of the spatial area 18 that is recorded by means of the sensor unit 12. The configuration tool then determines virtual distance values (second distance values) relative to the pixels on which the virtual protection zone 28 is "imaged".

In accordance with the steps 90a, 90b, a first and a second image are simultaneously recorded in the monitoring operation by means of the at least two image recording units 14, 16. In accordance with the steps 92a, 92b, the first and second images are corrected. This correction can include a correction of the fixed pattern noise, rectification and other correction measures. In accordance with the steps 94a, 94b, modified first and second images having a reduced resolution are produced.

In accordance with step 96, disjoint image regions are then searched for in the modified images by comparing the modified images to one another. In accordance with step 98, any disjoint image regions found are assigned third distance values that, by definition, are smaller than the second distance values that define the location of the protection zones 28.

In accordance with step 100, a check is then performed as to whether the condition of "second distance values larger than third distance values" is fulfilled in individual pixels or pixel areas of the modified first and second images. If this is the case, an alarm signal 104 is generated in accordance with branch 102, because a disjoint image region then covers a subregion of the virtual protection zone 28. In accordance with step 104, the alarm signal can lead to the shutdown of the monitored installation, as explained above with reference to FIG. 1. As an alternative, it is also possible to output a warning signal only, or to trigger another safety function.

If the check in step 100 for all pixels or pixel areas leads to the result that no protection zone 28 is covered by a disjoint image region, a search is made for correlations in the first and second images in accordance with step 106. In accordance with step 108, so-called disparities relating to the correlations found are determined. In accordance with step 110, the disparities are used to determine first distance values that are representative of the distance of an object in the spatial area 18 relative to the sensor unit 12. In accordance with step 112, the next step is to compare the first and second distance values with one another. If the result of the comparison is that second distance values which represent the location of a protection zone 28 are larger than first distance values in the same pixel area, an intrusion into the protection zone 28 is detected. In accordance with step 104, the alarm signal is triggered then.

If the query 112 leads to the result that no protection zone 28 is intruded, the method branches to the steps 90a, 90b where the next images are recorded in accordance with step 114.

The determination of the first distance values by means of disparities is described in the abovementioned WO 2004/029502 A1 and in the publications mentioned there. In order to avoid repetitions, this document is incorporated by reference herewith.

The invention claimed is:

1. A method for monitoring a three-dimensional spatial area for safeguarding an automatically operating installation, the method comprising the steps of:
   providing a first image recording unit having a first viewing area and providing a second image recording unit having a second viewing area, the first and second viewing areas both being directed to the spatial area in a partially overlapping manner so as to form a common viewing area,
   defining at least one virtual protection zone within the common viewing area,
   recording a first image of the spatial area by means of the first image recording unit, and recording a second image of the spatial area by means of the second image recording unit,
   comparing the first and second images in order to identify disjoint image regions in the first and second images wherein a foreign object is present in one of the first and second images and is not detected in the other of said first and second images, and
   generating an alarm signal as a function of an identified disjoint image region and the virtual protection zone,
   wherein the alarm signal is generated whenever a disjoint image region is identified that at least partially obstructs the view of the virtual protection zone by one of the first and second image recording units, and
   wherein the alarm signal is not generated when the disjoint image region does not obstruct the view of the virtual protection zone.

2. The method of claim 1, further comprising a step of determining at least one first distance value which is representative of the spatial position of at least one foreign object in the common viewing area, wherein the alarm signal is also generated as a function of the first distance value.

3. The method of claim 2, wherein the first distance value is determined by means of a propagation time measuring method.

4. The method of claim 2, wherein the first distance value is determined by means of a stereoscopic comparison between the first and second images.

5. The method of claim 2, wherein the step of defining the virtual protection zone comprises a step of defining a second distance value, with the alarm signal being generated when the second distance value is greater than the first distance value.

6. The method of claim 5, wherein the disjoint image region is assigned a third distance value which is smaller than the second distance value.

7. The method of claim 2, wherein the step of comparing the first and second images for identifying disjoint image regions is carried out before the first distance value is determined.

8. The method of claim 1, wherein the first and the second images are recorded with a first image resolution, and the comparison for identifying the disjoint image regions is performed on the basis of a modified first and a modified second image, wherein the modified first and a modified second image have a lower second image resolution.

9. The method of claim 1, wherein the first and the second images are compared substantially completely in order to identify disjoint image regions.

10. The method of claim 1, further comprising a step of providing a third image recording unit having a third viewing area for recording a third image of the spatial area, with the first, the second and the third image recording units being arranged along two nonparallel straight lines and with their respective viewing areas substantially parallel to one another.

11. An apparatus for monitoring a three-dimensional spatial area for protecting an automatically operating installation, the apparatus comprising a first image recording unit having a first viewing area for recording a first image of the spatial area, and a second image recording unit having a second viewing area for recording a second image of the spatial area, the first and second viewing areas both being directed to the spatial area in a partially overlapping manner so as to form a common viewing area, the apparatus further comprising an evaluation unit with a memory for storing a data record that defines at least one virtual protection zone within the common viewing area, with the evaluation unit being designed to compare the first and second images in order to identify disjoint image regions in the first and second images wherein a foreign object is present in one of the first and second images and is not detected in the other of said first and second images, and with the evaluation unit being designed to trigger an alarm signal when a disjoint image region is identified that at least partially obstructs a view of the virtual protection zone by one of the first and second image recording units, and wherein the alarm signal is not generated when the disjoint image region does not obstruct the view of the virtual protection zone.

12. The apparatus of claim 11, wherein the evaluation unit is configured to determine at least one first distance value which is representative of the spatial position of at least one foreign object in the common viewing area, with the alarm signal being also generated as a function of the first distance value.

13. The apparatus of claim 12, wherein the evaluation unit is configured to determine the first distance value by means of a stereoscopic comparison between the first and second images.

14. The apparatus of claim 11, further comprising a third image recording unit having a third viewing area for recording a third image of the spatial area, with the first, the second and the third image recording units being arranged along two nonparallel straight lines and with their respective viewing areas substantially parallel to one another.

* * * * *